United States Patent [19]

Hasselbring

[11] Patent Number: 5,331,048
[45] Date of Patent: Jul. 19, 1994

[54] BLENDS OF VINYLAROMATIC-CONJUGATED DIENE BLOCK COPOLYMERS AND POLYBUTENES

[75] Inventor: Lori C. Hasselbring, Bartlesville, Okla.

[73] Assignee: Phillips Petroleum Company, Bartlesville, Okla.

[21] Appl. No.: 925,346

[22] Filed: Aug. 3, 1992

[51] Int. Cl.$^5$ .............................................. C08K 3/34
[52] U.S. Cl. ...................................... 525/98; 525/314
[58] Field of Search ................................... 525/98, 314

[56] References Cited

U.S. PATENT DOCUMENTS

| | | | |
|---|---|---|---|
| 3,850,858 | 11/1974 | Park | 260/27 B B |
| 3,993,613 | 11/1976 | Doss et al. | 260/27 R |
| 4,163,764 | 8/1979 | Nash | 525/2 |
| 4,414,340 | 11/1983 | Senatore et al. | 523/219 |
| 4,499,227 | 2/1985 | Bailey | 524/399 |
| 4,782,119 | 11/1988 | Tsutsumi et al. | 525/314 |
| 5,130,377 | 7/1992 | Trepka et al. | 525/314 |

OTHER PUBLICATIONS

Amoco Chemicals Bulletin 12-35, 1986.
Amoco Chemical Company Bulletin 12-L, "Amoco® Polybutenes the Versatile Liquid Polymers to Improve Your Product," undated.
G. M. Swisher and R. D. Mathis, "A Close-up of Blends Based on Butadiene-Styrene Copolymer," *Plastics Engineering*, pp. 53-56 (Jun. 1984).

*Primary Examiner*—Paul R. Michl
*Assistant Examiner*—Edward Cain
*Attorney, Agent, or Firm*—Morrison Bennett

[57] ABSTRACT

Blends of monovinyl aromatic-conjugated diene block copolymers with polybutene are provided. Methods of making these resins and articles made therefrom are provided.

15 Claims, No Drawings

BLENDS OF VINYLAROMATIC-CONJUGATED DIENE BLOCK COPOLYMERS AND POLYBUTENES

FIELD OF THE INVENTION

This invention relates to blends of monovinyl aromatic-conjugated diane block copolymers and polybutenes.

BACKGROUND OF THE INVENTION

Resinous monovinyl aromatic-conjugated diane block copolymers exhibit desirable properties such as clarity and the ability to toughen other plastics when used in blends.

However, there is a continuing need for resin blends which can be extruded into sheets or films or injection molded into articles having good impact strength, melt strength, flexural modulus, and economic feasibility. It is desirable that these properties be obtained without compromising clarity.

SUMMARY OF THE INVENTION

It is an object of this invention to provide blends of resinous monovinyl aromatic-conjugated diane block copolymers and polybutene polymers which can be extruded or injection molded into articles having an excellent combination of clarity, good melt strength, good impact strength, and good flexibility.

It is another object of this invention to provide methods for making such compositions.

It is still another object of this invention to provide such compositions which can be readily prepared by melt extrusion.

It is also an object of this invention to provide articles made from such compositions.

In accordance with one embodiment of this invention, resin blends which can be extruded or injection molded into articles having good clarity, impact strength and flexural modulus comprise:

(a) a monovinyl aromatic-conjugated diene block copolymer; and (b) at least one polybutene.

In accordance with another embodiment of this invention, resin blends which can be extruded or injection molded into articles having good clarity, impact strength and flexural modulus consist essentially of:

(a) a monovinyl aromatic-conjugated diene block copolymer; and (b) at least one polybutene.

In accordance with yet another embodiment of this invention, resin blends which can be extruded or injection molded into articles having good clarity, impact strength and flexural modulus consist of:

(a) a monovinyl aromatic-conjugated diene block copolymer; and (b) at least one polybutene.

In accordance with other embodiments of this invention, processes are provided for preparing these compositions and articles made from the compositions of this invention are provided.

DETAILED DESCRIPTION OF THE INVENTION

Improvements in properties of extruded or molded articles made from monovinyl aromatic-conjugated diene block copolymers can be obtained by using various blends of resins to impart desired properties to the compositions.

The present invention is directed to a class of new and useful blends of monovinyl aromatic-conjugated diene block copolymers and additive amounts of polybutene. These blends can be extruded or injection molded into articles which have surprising and unexpectedly good impact strength, melt strength, and flexural modulus, without compromise in clarity. These invention resin blends can be used for medical applications, food packaging, toys, housewares, and other applications requiring a clear flexible material.

In one embodiment, the resin compositions of this invention more particularly comprise:

(a) from about 80 to about 98 weight percent, more preferably from about 85 to about 97 weight percent, and most preferably from about 90 to about 95 weight percent, based on total weight of polymer in the composition, of monovinyl aromatic-conjugated diene copolymer; and (b) from about 2 to about 20 weight percent, more preferably from about 3 to about 15 weight percent, and most preferably from about 5 to about 10 weight percent, based on total weight of polymer in the composition, of polybutene.

The relative amounts of the two polymer components will vary according to the relative priority given objectives such as economic advantage, processability and performance.

Optionally, the compositions of this invention may contain additional additives.

Monovinyl Aromatic-Conjugated Diene Block Copolymers

The monovinyl aromatic-conjugated diene block copolymers useful in this invention are block copolymers derived from a monovinyl substituted aromatic compound and a conjugated diene. These include such block copolymers as the types AB, ABA, tapered AB and ABA and radial (star block) copolymers, where A represents a polymerized monovinyl aromatic compound, usually styrene, and B represents a polymerized conjugated diene, usually 1,3-butadiene. The rubbery B block could be polybutadiene, a random or tapered styrene/butadiene copolymer, polyisoprene, a random or tapered styrene-isoprene copolymer, or mixtures thereof. Presently preferred is butadiene and/or isoprene.

For most applications, polymodal styrene-butadiene block copolymers having a Shore D hardness as measured by ASTM D 2240-86 of about 60 or higher, more preferably from about 64 to about 80, are presently preferred. These copolymers, having resinous properties, contain from about 50 to about 95 weight percent polymerized styrene, more preferably from about 65 to about 85 weight percent, and most preferably from about 70 to 80 weight percent polymerized styrene, based on total weight of the copolymer. The remainder of the block copolymer is polymerized conjugated diene. They are prepared so that at least a portion of the final product is of a coupled character, linear or branched or both linear and branched.

Basic preparation of the useful monovinyl aromatic-conjugated diene block copolymers is disclosed in U.S. Pat. No. 2,975,160.

The presently preferred polymodal block copolymers can be produced in accordance with U.S. Pat. Nos. 3,639,517 and 3,251,905. More specifically, they can be prepared by sequential charge copolymerization such as for example, that described in U.S. Pat. Nos. 4,584,346, 4,091,053, 4,704,434 and 4,704,435, the disclosures of which are hereby incorporated herein by reference.

Polybutene

The polybutenes contemplated as useful in this invention are low molecular weight polybutenes composed predominantly of mono-olefins having four carbon atoms (85 to 98 percent by weight), the balance being isoparaffins. The polymer is an aliphatic olefin similar to polyisobutylene although some 1- and 2- butenes are incorporated. Generally, the polybutenes used in this invention are viscous, non-drying liquid polymers which are odorless and colorless. The molecular weight of the polybutene should be in the range of about 250 to about 1350, more preferably from about 300 to about 1800, and most preferably from about 320 to about 460. Such polybutenes which are particularly useful in this invention are available from Amoco Chemicals under the trade names Panalane hydrogenated polybutene, ACTIPOL activated polybutene, Amoco ® L-14 polybutene, Amoco ® L-100 polybutene, and from Exxon under the trade name Parapol ® 450.

An amount of polybutene sufficient to improve the impact strength and/or flexibility of articles made from the blends of this invention should be used. Use of too small an amount of polybutene would not provide the benefits to be obtained from practice of this invention. Use of too large an amount of polybutene would result in lower tensile yield and tensile break strengths of articles made from the invention polymer blends.

Additives

The blends of this composition may contain certain other additives to plasticize, improve processability, extend, reinforce, fill, lubricate, prevent oxidation, flame retard, dye, pigment, etc., the polymeric composition. Such additives are well known in the art and may be incorporated without departing from the scope of the invention. The amount of additives may vary widely according to the additive, and/or its form, and/or its concentration.

Preparation

The blends of this invention can be prepared by any suitable means including blending, tumbling and extrusion. Examples of these methods include, but are not limited to, dry mixing in the form of a powder, wet mixing in the form of a solution or slurry, and melt extrusion compounding.

The monovinyl aromatic-conjugated diene block copolymer, polybutene, and any other ingredients or additives, may be mechanically blended together in the desired proportions with the aid of any suitable mixing device conveniently used for mixing rubbers or plastics, such as, for example, a differential roll mill, a Banbury mixer, or an extruder.

In these types of methods, the monovinyl aromatic-conjugated diene block copolymer, polybutene, and any other components, reinforcement material, filler and additives used, can be in any form, such as, for example, fluff, powder, granulate, pellet, solution, slurry, and/or emulsion. Any additive can be combined with the polymers according to any method known in the art. Examples of incorporation methods include, but are not limited to, dry mixing in the form of a powder and wet mixing in the form of a solution or slurry.

Melt extrusion compounding can be carried out using any suitable method such as in single screw or twin screw extruders or other melt extruders at temperatures above the melting point of the polymers.

The presently preferred method comprises blending the polymer in powder or granular form with liquid polybutene, extruding the blend, chopping into pellets and final processing (such as injection molding or sheet extrusion).

In order to facilitate thorough mixing of the polymers and to develop the desired combination of physical properties, the mechanical blending is carried out at a sufficiently high temperature to soften the polymers so that they are thoroughly dispersed and intermingled with each other. Usually the block copolymer, which characteristically is the higher softening material of the composition, will govern the mixing temperature selected. Generally, temperatures in the range of about 350° F. to about 450° F. would be used. Mixing is continued until an essentially uniform blend is obtained.

Alternatively, the block copolymer and polybutene may be solution blended using one or more suitable solvents.

The monovinyl aromatic-conjugated diene and polybutene blends of this invention can be made into consumer products and housewares having a clear, colorless appearance. Articles made from the monovinyl aromatic-conjugated diene and polybutene blends of this invention have excellent flexibility and tensile impact strength. Hinge life of articles such as video cassette cases made from the resin blends of this invention is unexpectedly good compared with that of articles made from neat monovinyl aromatic-conjugated diene resins. Use of polybutene in blends with monovinyl aromatic-conjugated diene resins has obvious economic advantages.

The following examples will be used to describe the invention and should be taken as illustrative and not restrictive.

EXAMPLES

In the following examples, these test methods were used.

| Property | ASTM Method |
| --- | --- |
| Flow rate, Condition 200/5.0, g/10 min | D 1238-88 |
| Tensile strength at yield and break, MPa | D 638-89 at 50 mm/min |
| Elongation, % | D 638-89 at 50 mm/min |
| Flexural modulus, MPa | D 790-86 |
| Izod impact strength, notched and unnotched, J/m | D 256-88 |
| Shore D hardness | D 2240-86 |
| Vicat softening point, °C. | D 1525-87 |

The resinous styrene-butadiene copolymers used in these examples were KR03 and KR01 grades K-Resin ® polymers, both products of Phillips Petroleum Company. Both copolymers contain about 75 weight percent styrene and about 25 weight percent butadiene. KR03, designated Polymer SB-1 in the examples, is a polymodal molecular weight distribution copolymer before coupling and has a nominal flow rate of 8 g/10 min. KR01, designated Polymer SB-2 in the examples, is a bimodal molecular weight distribution copolymer before coupling and has a nominal flow rate of 8 g/10 min. Both resins contain low levels of coupling agents.

Example I

A series of polymer samples was prepared to demonstrate the effect of incorporating differing levels of a 320 number average molecular weight (Mn) polybutene (designated PB-1) in a resinous styrene-butadiene copolymer. Styrene-butadiene copolymer SB-1 pellets were metered into a Werner & Pfleiderer ZSK-30 vented twin-screw extruder with a screw feeder, while the desired amount of PB-1 was metered into the extruder by a diaphragm pump. The blends were extruded with an open vent and with a barrel temperature of 210° C. The extruded polymer blend was injection molded into test specimens on an Arburg 221E All-Rounder injection molder with a barrel temperature of 210° C. and a mold temperature of 25° C.

Polymer 1 was a control sample containing only Polymer SB-1 and Polymers 2 through Polymer 6 were prepared with 2 to 20 weight percent PB-1. The injection molded parts were tested for their properties and the results are summarized in Table I.

TABLE I

| | Polymer Properties | | | | | |
|---|---|---|---|---|---|---|
| | Polymer | | | | | |
| | 1[a] | 2 | 3[b] | 4[c] | 5 | 6 |
| Components | | | | | | |
| SB-1[d], wt % | 100 | 98 | 95 | 90 | 85 | 80 |
| PB-1[e], wt % | 0 | 2 | 5 | 10 | 15 | 20 |
| Properties | | | | | | |
| Flow rate, g/10 min. | 7.4 | 9.7 | 18 | 35 | 84 | 140 |
| Tensile yield, MPa | 26 | 22 | 21 | 16 | 11 | 8 |
| Tensile Break, MPa | 26 | 23 | 20 | 17 | 14 | 12 |
| Elongation, % | 254 | 234 | 262 | 325 | 365 | 386 |
| Flexural modulus, MPa | 1385 | 1378 | 1268 | 1130 | 909 | 634 |
| Izod impact, notched, J/m | 21 | 21 | f | 454 | 443 | 427 |
| Gardner impact, J/m | 6299 | — | 5658 | 4804 | 4164 | 3523 |
| Shore D hardness | 66 | 66 | 62 | 57 | 50 | 46 |
| Vicat softening point, °C. | 88 | 86 | 81 | 76 | 74 | 69 |
| Haze, % | 3.0 | — | 1.9 | 1.9 | 2.6 | 3.1 |
| Gloss, % | 165 | — | 167 | 170 | 163 | 158 |
| Light transmission, % | 90 | — | 90 | 90 | 90 | 88 |

[a]Average properties of two samples.
[b]Average properties of five samples.
[c]Average properties of three samples.
[d]KR03 K-Resin ® styrene-butadiene copolymer.
[e]Amoco ® L-14 polybutene, Mn = 320.
[f]Wide variation in values.

The notched Izod impact of samples made with greater than about 5 weight percent PB-1 was increased significantly over that of control Polymer 1. There were also increases in the polymer flow rate and molded part elongation with increased polybutene level. Decreases were observed in tensile yield, tensile break, flexural modulus, hardness, and Vicat softening point with increased polybutene content. The molded parts were clear and not tacky.

Example II

This example demonstrates the effect of the polybutene on the lower temperature impact properties of a styrene-butadiene copolymer. Polymer samples 7 through 11 were prepared from Polymer SB-1 and several levels of polybutene PB-1 as described in Example I.

Polymer 7 contains only Polymer SB-1 and Polymers 8 through 11 were made with various levels of PB-1. Low temperature Izod impact studies (Table II) show that the Izod impact is significantly improved at levels greater than 5 weight percent PB-1 at temperatures down to 0° C.

TABLE II

| Low Temperature Impact | | | | | |
|---|---|---|---|---|---|
| | Polymer | | | | |
| | 7 | 8 | 9 | 10 | 11 |
| Components | | | | | |
| SB-1[a], wt % | 100 | 95 | 90 | 85 | 80 |
| PB-1[b], wt % | 0 | 5 | 10 | 15 | 20 |
| Properties | | | | | |
| Izod impact, notched, J/m at: | | | | | |
| 25° C. | 43 | 48 | 496 | c | c |
| 0° C. | 21 | 48 | 395 | c | c |
| −20° C. | — | — | 37 | — | — |
| −40° C. | 11 | 11 | 16 | d | d |

[a]KR03 K-Resin ® styrene-butadiene copolymer.
[b]Amoco ® L-14 polybutene, Mn = 320.
[c]No break.
[d]Wide variation in values.

Example III

This example describes the effect of higher molecular weight polybutenes in a resinous styrene-butadiene copolymer. Five samples were prepared from Polymer SB-1 and two polybutenes, designated PB-2 and PB-3, with number average molecular weights of 420 and 460, respectively. The polybutenes were physically mixed with Polymer SB-1 pellets and then extruded and injection molded as described in Example I.

Polymer 12 was a 100 weight percent Polymer SB-1 control and Polymers 13 through 16 were blends made from 2 to 10 weight percent PB-2 (Mn=420) and PB-3 (Mn =460). The molded part properties listed in Table III show that the impact properties of the blends made from about 5 weight percent and above of both polybutenes were increased. However, unlike the clear, nontacky molded parts described in Example I, the molded parts prepared in this example were hazy and tacky.

TABLE III

| | Polymer Properties | | | | |
|---|---|---|---|---|---|
| | Polymer | | | | |
| | 12 | 13 | 14 | 15 | 16 |
| Components | | | | | |
| SB-1[a], wt % | 100 | 90 | 98 | 95 | 90 |
| PB-2[b], wt % | 0 | 10 | 0 | 0 | 0 |
| PB-3[c], wt % | 0 | 0 | 2 | 5 | 10 |
| Properties | | | | | |
| Tensile yield, MPa | 25 | 16 | 23 | 16 | 21 |
| Tensile break, MPa | 25 | 19 | 25 | 19 | 22 |
| Elongation, % | 228 | 298 | 249 | 267 | 251 |
| Flexural modulus, MPa | 1399 | 1399 | 1350 | 1171 | 1247 |
| Izod impact, notched, J/m | 16 | 534 | 27 | 416 | 464 |
| Shore D hardness | 66 | 58 | 65 | 60 | 63 |
| Vicat softening point, °C. | 88 | 70 | 81 | 78 | 78 |

[a]KR03 K-Resin ® styrene-butadiene copolymer.
[b]Exxon Parapol 450 polybutene, Mn = 420.
[c]Amoco ® L-100 polybutene, Mn = 460.

Example IV

The effect of other higher molecular weight polybutenes on the properties of Polymer SB-1 styrene-butadiene copolymer is demonstrated in this example. Samples were prepared from Polymer SB-1 and two polybutene samples, designated PB-4 and PB-5, with number average molecular weights of 920 and 1290, respectively. The polybutenes were physically mixed with Polymer SB-1 pellets and then extruded and injection molded as described in Example I.

Polymer 12 was the same control sample containing only the styrene-butadiene copolymer that was described in Example III. Polymers 17 through 20 were prepared from various levels of the polybutenes PB-4 (Mn=920) and PB-5 (Mn=1290). Properties of the injection molded parts in Table IV show that the Izod impact properties were increased at the 5 weight percent polybutene level. However, unlike the samples in Example I, the molded parts were hazy and tacky.

TABLE IV

| | Polymer Properties | | | | |
|---|---|---|---|---|---|
| | Polymer | | | | |
| | 12 | 17 | 18 | 19 | 20 |
| Components | | | | | |
| SB-1$^a$, wt % | 100 | 98 | 95 | 98 | 95 |
| PB-4$^b$, wt % | 0 | 2 | 5 | 0 | 0 |
| PB-5$^c$, wt % | 0 | 0 | 0 | 2 | 5 |
| Properties | | | | | |
| Tensile yield, MPa | 25 | 22 | 19 | 22 | 19 |
| Tensile break, MPa | 25 | 23 | 20 | 22 | 22 |
| Elongation, % | 228 | 256 | 263 | 239 | 273 |
| Flexural modulus, MPa | 1399 | 1344 | 1199 | 1344 | 1261 |
| Izod impact, notched, J/m | 16 | 21 | 587 | 32 | 587 |
| Shore D hardness | 66 | 65 | 62 | 65 | 64 |
| Vicat softening point, °C. | 88 | 86 | 83 | 87 | 86 |

$^a$KR03 K-Resin ® styrene-butadiene copolymer.
$^b$Amoco ® H-100 polybutene, Mn = 920.
$^c$Amoco ® H-300 polybutene, Mn = 1290.

Example V

This example describes the use of an epoxy-terminated polybutene with a styrene-butadiene copolymer. Blends of Polymer SB-1 with epoxy-terminated polybutene PB-1E (Mn=320), at levels of 2 to 10 weight percent were prepared as described in Example II.

Polymer 12 was the same control sample containing only the styrene-butadiene copolymer that was described in Example III. Polymers 21 through 23 were prepared from 2, 5, and 10 weight percent PB-1E. As shown in the summary of results in Table V, the epoxy-terminated polybutene did not provide the substantial increase in Izod impact at the same weight percent polybutene as did the non-epoxy terminated polybutene in Example I. Polymer 23, which was prepared from 10 weight percent PB-1E, had variable Izod impact values, but the impact was clearly increased compared with the other samples.

TABLE V

| | Polymer Properties Epoxy-terminated Polybutene | | | |
|---|---|---|---|---|
| | Polymer | | | |
| | 12 | 21 | 22 | 23 |
| Components | | | | |
| SB-1$^a$, wt % | 100 | 98 | 95 | 90 |
| PB-1E$^b$, wt % | 0 | 2 | 5 | 10 |
| Properties | | | | |
| Flow rate, g/10 min. | 7.5 | — | 13 | 20 |
| Tensile yield, MPa | 25 | 23 | 21 | 19 |
| Tensile break, MPa | 25 | 23 | 21 | 17 |
| Elongation, % | 228 | 243 | 284 | 244 |
| Flexural modulus, MPa | 1399 | 1344 | 1233 | 1213 |
| Izod impact, notched, J/m | 16 | 21 | 27 | c |
| Shore D hardness | 66 | 65 | 65 | 62 |
| Vicat softening point, °C. | 88 | 80 | 74 | 70 |

$^a$KR03 K-Resin ® styrene-butadiene copolymer.
$^b$Amoco Actipol E6 epoxy-terminated polybutene, Mn = 320.
$^c$Wide variation in values.

Example VI

This example contained control runs showing that a styrene-butadiene copolymer which was bimodal before coupling did not produce the same enhanced Izod impact properties that were observed with the polymodal copolymers in previous examples. Blends of Polymer SB-2, a bimodal butadiene-styrene copolymer, with polybutenes PB-1, PB-3, PB-4, and PB-5 were prepared as described in Example I for PB-1 and Example III for the others.

Properties of injection molded parts made from the blends are shown in Table VI. Polymer 24 was a control polymer made with only Polymer SB-2. Polymers 25 through 31 were prepared with different levels of polybutenes. Only Polymer 29, made with 10 weight percent PB-3, showed a significant increase in the Izod impact; however, the molded part was hazy and tacky.

TABLE VI

| | Polymer Properties | | | | | | | |
|---|---|---|---|---|---|---|---|---|
| | Polymer | | | | | | | |
| | 24 | 25 | 26$^a$ | 27 | 28 | 29 | 30 | 31 |
| Components | | | | | | | | |
| SB-2$^b$, wt % | 100 | 95 | 90 | 85 | 95 | 90 | 95 | 95 |
| PB-1$^c$, wt % | 0 | 5 | 10 | 15 | 0 | 0 | 0 | 0 |
| PB-3$^d$, wt % | 0 | 0 | 0 | 0 | 5 | 10 | 0 | 0 |
| PB-4$^e$, wt % | 0 | 0 | 0 | 0 | 0 | 0 | 5 | 0 |
| PB-5$^f$, wt % | 0 | 0 | 0 | 0 | 0 | 0 | 0 | 5 |
| Properties | | | | | | | | |
| Tensile yield, MPa | 33 | 24 | 21 | 16 | 29 | 18 | 29 | 28 |
| Tensile break, MPa | 19 | 14 | 15 | 10 | 20 | 21 | 16 | 16 |
| Elongation, % | 131 | 62 | 51 | 67 | 26 | 25 | 311 | 90 |
| Flexural modulus, MPa | 1619 | 1419 | 1254 | 1220 | 1571 | 1158 | 1461 | 1509 |
| Izod impact, notched, J/m | 21 | 16 | 21 | 21 | 21 | 566 | 21 | 16 |
| Shore D hardness | 73 | 68 | 64 | 54 | 71 | 58 | 70 | 71 |

TABLE VI-continued

Polymer Properties

| | Polymer | | | | | | |
|---|---|---|---|---|---|---|---|
| | 24 | 25 | 26[a] | 27 | 28 | 29 | 30 | 31 |
| Vicat softening point, °C. | 92 | 77 | 72 | 66 | 84 | 72 | 89 | 90 |

[a]Average properties of two samples.
[b]KR01 K-Resin ® styrene-butadiene copolymer.
[c]Amoco ® L-14 polybutene, Mn = 320.
[d]Amoco ® L-100 polybutene, Mn = 460.
[e]Amoco ® H-100 polybutene, Mn = 920.
[f]Amoco ® H-300 polybutene, Mn = 1290.

Example VII

The effect of a low molecular weight polybutene on the hinge life of articles made from two different styrene-butadiene copolymers is demonstrated in this example. Ten weight percent PB-1 (Mn=320) was blended with Polymers SB-1 and SB-2 in the manner described in Example I. Polymer SB-1 is a polymodal copolymer before coupling and Polymer SB-2 is a bimodal copolymer before coupling.

Hinge life testing was done with a 1.5 kg load on a Tinius Olsen Folding Endurance Tester. The values reported in Table VII were the average number of flexes until break for ten samples. A substantial increase in hinge life was observed for articles made from Polymer 32, which was prepared with 10 weight percent PB-1 in Polymer SB-1, compared with control Polymer 24. However, the hinge life decreased for articles made from Polymer 34, which was prepared with 10 weight percent PB-1 in Polymer SB-2, compared with articles made from control Polymer 33 which contained no PB-1. This example shows the substantial difference in behavior of polybutene in these particular polymodal and bimodal styrene-butadiene copolymers.

TABLE VII

Hinge Life Testing

| | Polymer | | | |
|---|---|---|---|---|
| | 24 | 32 | 33 | 34 |
| Components | | | | |
| SB-1[a], wt % | 100 | 90 | 0 | 0 |
| SB-2[b], wt % | 0 | 0 | 100 | 90 |
| PB-1[c], wt % | 0 | 10 | 0 | 10 |
| Hinge life property | | | | |
| Average flexes | 263 | 1198 | 732 | 336 |

[a]KR03 K-Resin ® styrene-butadiene copolymer.
[b]KR01 K-Resin ® styrene-butadiene copolymer.
[c]Amoco ® L-14 polybutene, Mn = 320.

Example VIII

The amount of polybutene actually present in blends prepared with a styrene-butadiene copolymer was determined by proton nuclear magnetic resonance spectroscopy (NMR). A series of blends of Polymer SB-1 with several levels of polybutene PB-1 were extruded and molded as described in Example I.

The level of polybutene before extrusion was calculated by the amounts of each component fed to the extruder. Polybutene levels after extrusion and after molding were determined by NMR. Polymer blends 5 and 6 are from Example I. Polymer 35 is a control sample containing no polybutene. As shown in Table VIII, the polybutene levels in Polymers 36, 37, 5, and 6 decreased during open-vented extrusion at 210° C. and little further change in polybutene level was observed after molding.

TABLE VIII

Effect of Extrusion and Molding on Polybutene Contents

| | Polymer | | | | |
|---|---|---|---|---|---|
| | 35 | 36 | 37 | 5 | 6 |
| PB-1[a], wt % | | | | | |
| Before extrusion | 0 | 5 | 10 | 15 | 20 |
| After extrusion | 0 | 1.9 | 4.8 | 8.4 | 11.0 |
| After molding | 0 | 1.9 | 4.9 | 8.1 | 10.4 |

[a]Weight percent Amoco ® L-14 polybutene in KR03 K-Resin ® (Polymer SB-1) styrene-butadiene copolymer.

Example IX

Polymer blends containing an hydrogenated polybutene and a styrene-butadiene copolymer were prepared to decrease the loss of polybutene during extrusion. Blends were prepared with 5 and 10 weight percent of a hydrogenated polybutene, designate PB-1H, with a number average molecular weight of 320, in Polymer SB-1 styrene-butadiene copolymer as described in Example I.

The injection molded part properties, Table IX, showed that an increase in Izod impact strength over the control Polymer 12 was obtained at both 5 and 10 weight percent hydrogenated polybutene (Polymers 38 and 39).

TABLE IX

Properties of Articles Made From Hydrogenated Polybutene Blends

| | Polymer | | |
|---|---|---|---|
| | 12 | 38[a] | 39 |
| Components | | | |
| SB-1[b], wt % | 100 | 95 | 90 |
| PB-1H[c], wt % | 0 | 5 | 10 |
| Properties | | | |
| Flow rate, g/10 min. | 7.5 | 20 | 39 |
| Tensile yield, MPa | 25 | 19 | 15 |
| Tensile break, MPa | 25 | 21 | 179 |
| Elongation, % | 228 | 283 | 311 |
| Flexural modulus, MPa | 1399 | 1282 | 1213 |
| Izod impact, notched, J/m | 16 | 416 | 454 |
| Shore D hardness | 66 | 59 | 53 |
| Vicat softening point, °C. | 88 | 73 | 68 |

[a]Average values from two samples.
[b]KR03 K-Resin ® styrene-butadiene copolymer.
[c]Amoco ® L-14E Panalane hydrogenated polybutene, Mn = 320.

Example X

An attempt was made to decrease the loss of polybutene during extrusion by using a closed extruder vent. Several blends of Polymer SB-1 with PB-1 and PB-1H, both with Mn=320, were prepared as described in Example I, except for using a closed vent during extrusion.

Polymer 40 was a control polymer containing only Polymer SB-1. Polymers 41 through 45 were prepared with up to 10 weight percent of polybutene PB-1 or hydrogenated polybutene PB-1H. The properties of the molded parts (Table X) showed that with a closed vent during the extrusion step, 5 weight percent blends of both polybutenes gave enhanced Izod impact values over control Polymer 40.

TABLE X

| | Closed Vent Extrusion | | | | | |
|---|---|---|---|---|---|---|
| | Polymer | | | | | |
| | 40 | 41[a] | 42[a] | 43 | 44[a] | 45[a] |
| Components | | | | | | |
| SB-1[b], wt % | 100 | 95 | 90 | 98 | 95 | 90 |
| PB-1[c], wt % | 0 | 5 | 10 | 0 | 0 | 0 |
| PB-1H[d], wt % | 0 | 0 | 0 | 2 | 5 | 10 |
| Properties | | | | | | |
| Flow rate, g/10 min. | 5.4 | 21 | 39 | — | 21 | 38 |
| Tensile yield, MPa | 29 | 21 | 16 | 25 | 31 | 16 |
| Tensile break, MPa | 34 | 22 | 18 | 27 | 23 | 19 |
| Elongation, % | 301 | 276 | 338 | 245 | 293 | 329 |
| Flexural modulus, MPa | 1578 | 1302 | 1164 | 1461 | 1323 | 1171 |
| Izod impact, notched, J/m | 21 | 486 | 486 | e | 502 | 486 |
| Shore D hardness | 69 | 62 | 57 | 65 | 61 | 57 |
| Vicat softening point, °C. | 85 | 72 | 67 | 80 | 73 | 67 |

[a]Average properties of two samples.
[b]KR03 K-Resin ® styrene-butadiene copolymer.
[c]Amoco ® L-14 polybutene, Mn = 320.
[d]Amoco Panalane, L-14E hydrogenated polybutene, Mn = 320.
[e]Wide variation in values.

Example XI

This example demonstrated that a reduced extrusion temperature with a closed extruder vent produced improved Izod impact values with levels of 5 weight percent polybutene. Blends of Polymer SB-1 styrene-butadiene copolymer with polybutene PB-1 were prepared and extruded as described in Example I, except that a closed vent and reduced extruder temperatures were used during the extrusion.

Table XI shows the properties of the molded parts made from the blends. Blends made with 5 weight percent polybutene (Polymers 47 and 49) had enhanced Izod impact values at extrusion temperatures of 177° and 193° C. However, blends made with 3 weight percent polybutene (Polymers 46 and 48) had lower or variable Izod values.

TABLE XI

| | Low Temperature Extrusion[a] | | | |
|---|---|---|---|---|
| | Polymer | | | |
| | 46 | 47 | 48 | 49 |
| Components | | | | |
| Sb-1[b], wt % | 97 | 95 | 97 | 95 |
| PB-1[c], wt % | | | | |
| Before extrusion | 3 | 5 | 3 | 5 |
| After extrusion[d] | 1.1 | 2.7 | 1.3 | 3.1 |
| Processing Temperature, °C. | 177 | 177 | 193 | 193 |
| Properties | | | | |
| Tensile yield, MPa | 24 | 20 | 24 | 27 |
| Tensile break, MPa | 25 | 20 | 24 | 27 |
| Elongation, % | 218 | 264 | 243 | 252 |
| Flexural modulus, MPa | 1447 | 1344 | 1426 | 1302 |
| Izod impact, notched, J/m | 32 | 475 | e | 486 |
| Shore D hardness | 65 | 62 | 65 | 62 |

TABLE XI-continued

| | Low Temperature Extrusion[a] | | | |
|---|---|---|---|---|
| | Polymer | | | |
| | 46 | 47 | 48 | 49 |
| Vicat softening point, °C. | 78 | 73 | 78 | 72 |

[a]Extruder vent closed.
[b]KR03 K-Resin ® styrene-butadiene copolymer.
[c]Amoco ® L-14 polybutene, Mn = 320.
[d]Determined by NMR.
[e]Values vary widely.

Example XII

Higher temperature exposures of molded samples prepared from a styrene-butadiene copolymer and a polybutene were carried out to determine the effect of aging on the Izod impact properties of the blend. A series of blends prepared in earlier examples from butadiene-styrene copolymer SB-1 and polybutene PB-1 were used. Polymer 35 was a control polymer made from only Polymer SB-1. Polymers 36, 37, 5, and 6 contained up to 20 weight percent PB-1.

The injection molded parts were aged at 60° C. for two weeks and the Izod impact values were compared with values obtained before aging. The results (Table XII) showed little change in impact by the thermal aging. The aged bars showed no change in clarity and did not become tacky.

TABLE XII

| | Hot Room Testing | | | | |
|---|---|---|---|---|---|
| | Polymer | | | | |
| | 35 | 36 | 37 | 5 | 6 |
| Components | | | | | |
| SB-1, wt % | 100 | 95 | 90 | 85 | 80 |
| PB-1, wt % | 0 | 5 | 10 | 15 | 20 |
| Properties | | | | | |
| Izod impact, notched, J/m Initial | 21 | 32 | 406 | 443 | 427 |
| After two weeks at 60° C. | 27 | 27 | 432 | 427 | 390 |

[a]KR03 K-Resin ® styrene-butadiene copolymer.
[b]Amoco ® L-14 polybutene, Mn = 320.

Polymer 37, which was prepared from styrene-butadiene copolymer SB-1 and 10 weight percent polybutene PB-1, was also aged at 60° C. for 5 weeks with Izod impact testing done each week. The results (Table XIII) showed no loss in impact strength during the thermal exposure and the bars remained clear and non-tacky.

TABLE XIII

| | Longer Term Hot Room Aging of Polymer 37 | | | | | |
|---|---|---|---|---|---|---|
| | Elapsed Time at 60° C., weeks | | | | | |
| | 0 | 1 | 2 | 3 | 4 | 5 |
| Izod impact[b], notched, J/m | 464 | 438 | 432 | 438 | 422 | 448 |

[a]Sample 37, see Table XII.
[b]Average value of 2 or 3 samples.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

What is claimed is:

1. A composition comprising: (a) a resinous polymodal monovinyl aromatic-conjugated diene block copolymer; and (b) at least one liquid polybutene;

wherein said polymodal monovinyl aromatic-conjugated diene block copolymer is present in an amount in the range of about 85 to about 97 weight percent, based on total weight of said monovinyl aromatic-conjugated diene block copolymer and said at least one polybutene; and wherein said at least one polybutene is present in an amount in the range of about 3 to about 20 weight percent, based on total weight of said monovinyl aromatic-conjugated diene block copolymer and said at least one polybutene.

2. A composition as recited in claim 1 wherein said resinous polymodal monovinyl aromatic-conjugated diene block copolymer is a styrene-butadiene block copolymer.

3. A composition as recited in claim 1 wherein said polymodal monovinyl aromatic-conjugated diene block copolymer is present in an amount in the range of about 85 to about 97 weight percent, based on total weight of said monovinyl aromatic-conjugated diene block copolymer and said at least one polybutene; and wherein said at least one polybutene is present in an amount in the range of about 3 to about 15 weight percent, based on total weight of said monovinyl aromatic-conjugated diene block copolymer and said at least one polybutene.

4. A composition as recited in claim 1 wherein said polymodal monovinyl aromatic-conjugated diene block copolymer is present in an amount in the range of about 90 to about 95 weight percent, based on total weight of said monovinyl aromatic-conjugated diene block copolymer and said at least one polybutene; and wherein said at least one polybutene is present in an amount in the range of about 5 to about 10 weight percent, based on total weight of said monovinyl aromatic-conjugated diene block copolymer and said at least one polybutene.

5. A composition as recited in claim 1 wherein said at least one polybutene is an hydrogenated polybutene.

6. A composition as recited in claim 1 wherein said at least one polybutene is an epoxy-terminated polybutene.

7. A method for improving the impact strength of monovinyl aromatic-conjugated diene block copolymers, said method comprising admixing with a polymodal monovinyl aromatic-conjugated diene block copolymer an amount of low molecular weight polybutene in the range of about 3 to about 20 weight percent based on total weight of the composition.

8. A method as recited in claim 7 wherein said amount of said low molecular weight polybutene is in the range of about 3 to about 15 weight percent based on total weight of the composition.

9. A method as recited in claim 7 wherein said amount of said low molecular weight polybutene is in the range of about 5 to about 10 weight percent based on total weight of the composition.

10. A method as recited in claim 7 wherein said monovinyl aromatic-conjugated diene block copolymer is a resinous styrene-butadiene block copolymer.

11. A method as recited in claim 7 wherein said low molecular weight polybutene is an hydrogenated polybutene.

12. A method as recited in claim 7 wherein said low molecular weight polybutene is an epoxy-terminated polybutene.

13. Articles made from the composition of claim 1.

14. Articles made from the composition of claim 5.

15. Articles made from the composition of claim 6.

* * * * *